Dec. 11, 1945.  S. L. EASON  2,390,697
ROOFING OR SURFACING MATERIAL
Filed July 4, 1942
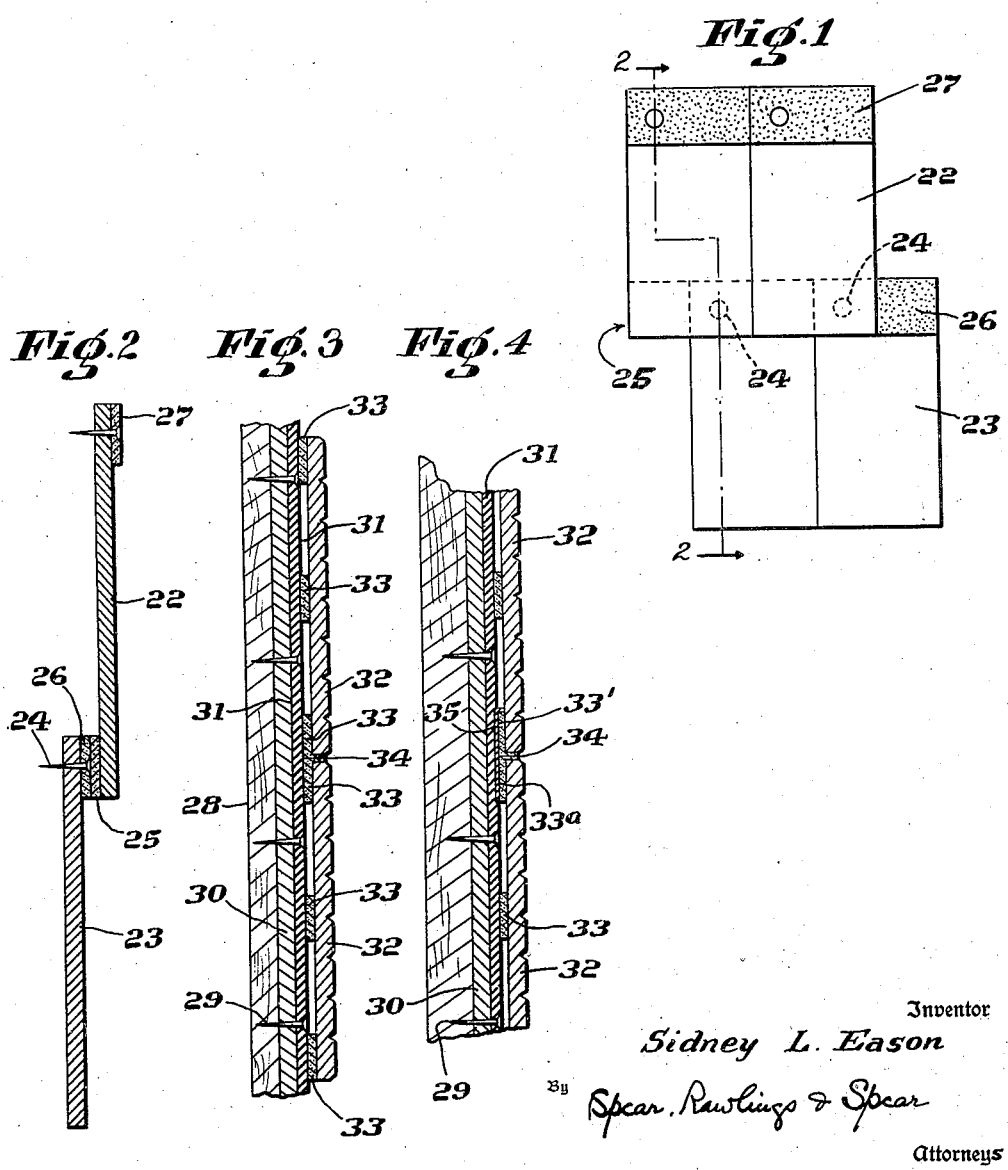
Inventor
Sidney L. Eason
By Spear, Rawlings & Spear
Attorneys Patented Dec. 11, 1945

2,390,697

UNITED STATES PATENT OFFICE 2,390,697

ROOFING OR SURFACING MATERIAL

Sidney Lanier Eason, Charleston, S. C.

Application July 4, 1942, Serial No. 449,747

3 Claims. (Cl. 108—7)

This invention relates to roofing or surfacing materials and covers improvements upon the structures and methods illustrated in my prior Patents Nos. 2,003,503, 2,160,845, 2,215,349, and 2,241,058 in respect to the manufacture and application of the materials and the manner of obtaining waterproof and weatherproof seals in the field when joining or lapping areas of related courses of roofing or surfacing materials are brought into joint-forming relationship.

In my aforesaid patents, I taught the art fabric-to-fabric seals by the use of superimposed foldable or selvage edge fabric strips which were applied at the factory to the roofing or surfacing material in various arrangements and combinations. When related courses of material so equipped were brought into joint-forming relationship and the fabric strips overfolded or overlaid to produce closed joints or seams or laps, such joints were made watertight and weatherproof by applying thereto in the field adhesive waterproof cements which bonded the fabric-to-fabric joints and coated the same with a watertight covering. In some instances, certain of the fabric flaps or selvage edges were pervious and others were made impervious by impregnating them with a composition which was thermo-responsive to a hot iron, or its equivalent, in the field. In any case, however, the application of liquid cement, or heat, in the field requires extra material, extra skill, and extra equipment, all of which substantially increase the cost in field labor and substantially increase the final cost of the roofing or surfacing material.

The general object of my present invention is to obtain watertight and waterproof seals without the necessity of applying liquid adhesives or coatings, or heat, to the joints, laps or seams, in the field. These are usually applied under varying and frequently adverse weather conditions, and usually with unsikiled labor. By avoiding the necessity for their use, my invention greatly simplifies the application of the roofing or surfacing material, saves substantial costs in labor and in some instances in basic materials as well, and ensures a neatness of appearance which is practically impossible to obtain with unsightly and inconsistent field applications of varying and difficult-to-handle liquids.

Other objects and advantages of my invention will appear as the description proceeds.

In achieving my objects, I may utilize the various structures and arrangements disclosed in my prior patents, or combinations thereof. In a characteristic exemplification, the selected structure, is treated at the factory with a substance which, after drying, has the property of firmly adhering to a similarly treated structure when pressed into intimate contact therewith, while not adhering to foreign surfaces. This not only eliminates the need for supplying certain materials for field application, but reduces the cost of producing and applying the roofing and surfacing material, while giving a neat, reliable, and efficient waterproof or water-tight or weather resisting joint without exposed nails and without skill in application.

My factory-coated structure may be produced by directly applying the cohesive liquid to selected areas of the roofing or surfacing material proper. When dry, the cohesive liquid forms surfaces that may be brought into joining relationship with similar treated surfaces to bond the same firmly together without the use either of field-applied liquid cements or of heat.

The areas thus factory-furnished with the dried cohesive, constitute areas of the roofing or surfacing material different from the material itself. For joining purposes, such treated areas have the same cohesive affinity to each other, and hence having the same virtue as fabric-to-fabric sealing relationship, due to the circumstance that such areas expose contacting surfaces which will adhere firmly to similarly treated contacting surfaces, but will not adhere to foreign surfaces.

One important advantage of applying the cohesive substance to selected areas of the roofing or surfacing material proper, is that it can be allowed to dry at the factory and inasmuch as the dried cohesive surfaces will only firmly adhere and bond to identically treated dried cohesive surfaces, I may ship my treated roofing or surfacing material from the factory in customary roll or package form without danger that the cohesive treated surfaces will contact each other before the materials are brought into joining relationship with each other in the field.

If the cohesive substance is one which will not deteriorate, though kept in stock for an indefinite time, I need not use a protecting medium such as a covering tape while the material is in roll or package form. Such protective medium, however, may be desirable to keep the adhesive surfaces clean and free from foreign matter during handling processes and before exposing the cohesive treated surfaces to similar surfaces.

If, however, I use cohesive chemicals which may not have long life against deterioration, I may find it convenient to employ protective mediums to guard against too early deterioration while in roll or package form, or I may employ certain cohesive chemicals which, when dry, require to be activated in the field by a wiping coat of some suitable activator, such as kerosene or gasoline, in order to make these dried non-adhering surfaces activated to the extent that they will have cohesive affinity for each other although they will not firmly bond to foreign surfaces.

The principles of my present invention may be embodied in practically all of the structures, or combinations of structures, disclosed in my prior patents in which a fabric-to-fabric seal, or equivalent bonding of similar surfaces to each other is obtained, since my present invention develops a dried cohesive surface on selected areas of the roofing or surfacing materials regardless of the individual structure or structure combination selected.

Accordingly, the structures detailed in the accompanying drawing, have been selected to demonstrate the varied scope of the principles involved. It is to be understood, however, that such disclosure is purely illustrative and that many other applicable structures and combinations are possible.

In the drawing:

Fig. 1 is a face view illustrating the application of my invention to shingles, or sheet surfacing material, Fig. 2 is a section on the line 2—2 of Fig. 1, Fig. 3 is a fragmentary vertical section through a siding in accordance with my invention, and Fig. 4 is a view similar to Fig. 3 but showing a modification.

In Figs. 1 and 2, wherein I have illustrated the application of my invention to shingles, whether of single or strip type, overlapped shingles are shown at 22 and 23 to be nailed as at 24. Where the shingles overlap, I apply areas of coating substance 25 and 26. Such coating substance may be a liquid which, on drying, develops adhesive-cohesive properties when brought into joint-forming contact with similarly treated surfaces but will not adhere to any surface not similarly treated, or it may be a semi-plastic or other spreadable coating composition. As examples of such substance, I mention the rubber or rubber-like coating compositions commonly used in the so-called "friction" tape, or the latex coating composition sold under the trade-mark "Vultex." However, any other composition having the aforesaid properties may be used. These areas may take the form of strips of any suitable material impregnated or treated with such substance, or may be brushed-on stripes of such substance. In either case, when the shingles are laid, the areas 25 and 26 are pressed into intimate contact with each other to form the joint depicted in Figs. 1 and 2. The shingle 22 is provided, of course, along the upper edge of its outer face with another area 27 of coating substance similar to the areas 25 and 26 for contact with the similarly coated area at the lower inner face of the shingle in the next row above. In this way, "head lap" is also reduced and the maximum area of the shingle utilized exposed instead of concealed by excessive overlapping.

In Figs. 3 and 4, wherein I have illustrated the application of my invention to sidings of the type which are covered with an ornamental exterior surfacing as, for example, a sheet or sheets of imitation brick, I have indicated conventionally at 28 sheathing or clapboards to which is nailed at 29 a backing or fairing 30.

The outer face of the backing 30 is factory-covered in whole or in selected areas with a coating substance 31 similar to that heretofore described, and selected areas of the inner faces of the ornamental sheets of surfacing material 32 likewise have stripes 33 of such coating factory-applied thereto so that when the surfacing 32 is pressed against the backing 30 the coated areas 31 and 33 are adhered to each other to thereby anchor the surfacing in position.

In both Figs. 3 and 4 the coatings 33 adjacent the abutting edges of the sheets 32 may be extended into the space separating said edges, as indicated at 34 to seal the same.

In Fig. 4, such joint is further sealed by an attached flap strip 35 treated with coating substance similar to that designated 31 and 33. Strip 35 is anchored at one end to the area 33' immediately above the joint 34 and its free end lies in position to be sealed against the area 33a immediately below said joint when the assembly is completed.

In either case, the joint is well-sealed in a watertight and weatherproof manner.

The foregoing exemplifications illustrate generally the wide variety of structures and applications of my invention. I recognize, however, that still other combinations and variations are possible, and accordingly the structures selected for illustration are to be regarded only as examples and not as limiting embodiments. I also recognize that the treating agents used and their method of application may differ widely with differing service conditions. All such variations, whether in structure or materials or methods, are to be regarded as within the purview of my invention if within the limits of the appended claims.

What I therefore claim and desire to secure by Letters Patent is:

1. In building construction, an inner course of building material, an intermediate course of backing material nailed thereto, and an exposed course of surfacing sheets disposed in joint-forming relation to each other, the outer face of the backing course and the inner face of said surfacing course carrying solidified coatings of adhesive substance which have cohesive affinity for each other but will not adhere to any surface not similarly treated so that when said surfacing course is pressed against said backing course it will be interiorly adhered thereto by said mutually-contacting treatments.

2. The structure of claim 1, certain of the coatings on the inner face of the surfacing course being extended into the space separating the joint-forming edges of the sheets in said course to seal against each other and thereby seal said space.

3. The structure of claim 1, certain of the coatings on the inner face of the surfacing course being extended into the space separating the joint-forming edges of the sheets in said course to seal against each other and thereby seal said space, and a sealing strip treated with a similar treating substance and anchored at one end to one of said last-named coatings and sealable against the other of said last-named coatings.

SIDNEY LANIER EASON.